UNITED STATES PATENT OFFICE.

FRANCIS BASCHNAGEL, OF BEVERLY, MASSACHUSETTS.

IMPROVED PLASTIC COMPOUND.

Specification forming part of Letters Patent No. 27,343, dated March 6, 1860.

*To all whom it may concern:*

Be it known that I, FRANCIS BASCHNAGEL, of the town of Beverly, Essex county, State of Massachusetts, have invented a new and Improved Plastic Compound, resembling and applicable in a great many instances instead of hard rubber, papier-maché, artificial ivory, or similar substances; and I do hereby declare that the following is a full and exact description of the materials used, and of the operation to be performed for making this plastic compound, and for better explanation I divide my description under the following heads:

First. I boil old or waste leather in water till it becomes soft, doughy, and elastic, which is accomplished in from ten to twelve hours of boiling. The leather so modified is to be well dried and ground to a very fine powder, (No. 1.)

Secondly. I dissolve common glue in about five times its weight of warm water, evaporate the gelatinous solution to about one-third of its original volume, and add to it while yet hot about three per cent. of a solution of tannin, prepared by macerating one part of oak bark in three parts of water for a few hours, decanting the liquid, and evaporating it to about one-half of its original volume, or a solution of tannin prepared of any other tanning substance of the same strength, (No. 2.)

Thirdly. To the powder No. 1 I add sufficient of the product No. 2, so as to produce a stiff doughy mass, which is warmed up carefully till it gets soft enough to be pressed into heated molds or rolled into sheets on hot calender-rollers, or brought otherwise to the shape of the desired article. When cold the mass may be removed from the mold, and will form a hard, horny article, which may be further finished by carving, polishing, or varnishing.

Should it be desired to produce a more soft and elastic article, a little glycerine ought to be added to the mass before molding, and various colors may be produced or given at option by adding pigments. It may be likewise modified so as to be water-proof by adding linseed-oil or Venetian turpentine, or other oily or fatty substance; or, to increase at the same time its hardness, shellac or other varnish may be mixed with it.

I do not claim any of the materials or operations described above separately, nor any particular proportion of the materials; but

What I claim, and desire to secure by Letters Patent, is—

Combining the powder of leather previously boiled and dried with a mixture of solutions of glue and tannin to form a plastic compound, which may be modified and treated in the manner substantially as specified above.

FRANCIS BASCHNAGEL.

Witnesses:
JOS. GERHARD,
JUL. E. SCHWABER.